United States Patent
Nishimori et al.

(10) Patent No.: US 6,800,144 B2
(45) Date of Patent: Oct. 5, 2004

(54) PROCESS FOR PRODUCING RETAINER FOR CONSTANT VELOCITY JOINT POSSESSING IMPROVED MACHINABILITY AND FLEXURAL STRENGTH

(75) Inventors: Hiroshi Nishimori, Himeji (JP); Makoto Iguchi, Himeji (JP); Yoshimi Usui, Mooka (JP)

(73) Assignees: Sanyo Special Steel Co., Ltd., Hoyogo-ken (JP); Honda Giken Kogyo Kabushiki Kaisha, Tokyo-to (JP)

( * ) Notice: Subject to any disclaimer, the term of this patent is extended or adjusted under 35 U.S.C. 154(b) by 174 days.

(21) Appl. No.: 10/171,415
(22) Filed: Jun. 13, 2002
(65) Prior Publication Data US 2003/0047242 A1 Mar. 13, 2003

(30) Foreign Application Priority Data

Jun. 14, 2001 (JP) ........................................ 2001-179751

(51) Int. Cl.$^7$ ................................................ C23C 8/22
(52) U.S. Cl. ........................ 148/229; 148/233; 148/226
(58) Field of Search ................................. 148/233, 226, 148/229

(56) References Cited

U.S. PATENT DOCUMENTS 5,853,502 A * 12/1998 Aihara et al. ............... 148/319

6,641,680 B2 * 11/2003 Nishimori et al. ........... 148/229

FOREIGN PATENT DOCUMENTS

JP          09/053169          2/1997

* cited by examiner

*Primary Examiner*—Sikyin Ip
(74) *Attorney, Agent, or Firm*—Webb Ziesenheim Logsdon Orkin & Hanson, P.C.

(57) ABSTRACT

Disclosed is a process for producing a retainer for a constant velocity joint for automobiles or the like, which has improved flexural strength properties without sacrificing the machinability, using a steel corresponding to SCr 415 (JIS) or SCM 415 (JIS). This production process comprises the steps of: providing a steel comprising by weight carbon (C): 0.10 to 0.25%, silicon (Si): 0.03 to 0.15%, manganese (Mn): 0.20 to 0.60%, sulfur (S): 0.003 to 0.030%, chromium (Cr): 1.00 to 1.50%, titanium (Ti): 0.05 to 0.20%, boron (B): 0.0005 to 0.0050%, and nitrogen (N): not more than 0.01% with the balance consisting of iron (Fe) and inevitable impurities; hot forging the steel at a heating temperature of 1000 to 1100° C. to prepare a forged product having a Rockwell hardness of not more than 88 HRB; machining and optionally piercing the forged product; carburizing and quenching and tempering the machined steel to attain an effective case depth of 0.4 to 0.9 mm, the effective case depth being defined as the distance from the surface of the steel to the position of the steel in its depth direction where the Vickers hardness is HV 550.

1 Claim, 2 Drawing Sheets

PROCESS FOR PRODUCING RETAINER FOR CONSTANT VELOCITY JOINT POSSESSING IMPROVED MACHINABILITY AND FLEXURAL STRENGTH

BACKGROUND OF THE INVENTION

1. Field of the Invention

The present invention relates to a process for producing a retainer for a constant velocity joint, possessing improved machinability and flexural strength, as a boron-containing automobile component.

2. Background Art

A steel corresponding to SCr 415 (see JIS G 4104 (1979)) or SCM 415 (see JIS G 4105 (1979)) has hitherto been carburized, quenched, and tempered before use for a retainer for an automobile constant velocity joint (CVJ). In recent years, however, a reduction in weight of components is necessary for realizing an improvement in fuel consumption from the viewpoint of global environmental problems. The reduction in weight of the retainer requires the use of materials possessing excellent flexural strength. In the invention disclosed in Japanese Patent Laid-Open No. 53169/1997, a high-strength CVJ carburized and quenched component is provided using a boron-containing case hardening steel. On the other hand, the machinability should not be sacrificed from the viewpoint of reducing the production cost. In the above steel, the addition of alloying elements such as silicon (Si) and molybdenum (Mo) is indispensable, and, thus, a deterioration in machinability is unavoidable. This has led to the need to develop a retainer for a constant velocity joint possessing improved flexural strength without sacrificing the machinability.

SUMMARY OF THE INVENTION

It is an object of the present invention to provide a retainer using a steel corresponding to SCr 415 or SCM 415 for a constant velocity joint possessing improved flexural strength properties without sacrificing machinability for automobiles or the like.

According to one aspect of the present invention, there is provided a process for producing a retainer for a constant velocity joint having improved machinability and flexural strength properties, said process comprising the steps of:

providing a steel comprising by weight carbon (C): 0.10 to 0.25%, silicon (Si): 0.03 to 0.15%, manganese (Mn): 0.20 to 0.60%, sulfur (S): 0.003 to 0.030%, chromium (Cr): 1.00 to 1.50%, titanium (Ti): 0.05 to 0.20%, boron (B): 0.0005 to 0.0050%, and nitrogen (N): not more than 0.01% with the balance consisting of iron (Fe) and inevitable impurities;

hot forging the steel at a heating temperature of 1000 to 1100° C. to prepare a forged product having a Rockwell hardness of not more than 88 HRB;

machining and optionally piercing the forged product;

carburizing, quenching, and tempering the machined steel to attain an effective case depth of 0.4 to 0.9 mm, said effective case depth being defined as the distance from the surface of the steel to the position of the steel in its depth direction where the Vickers hardness is HV 550.

DETAILED DESCRIPTION OF THE INVENTION

Figure 1:
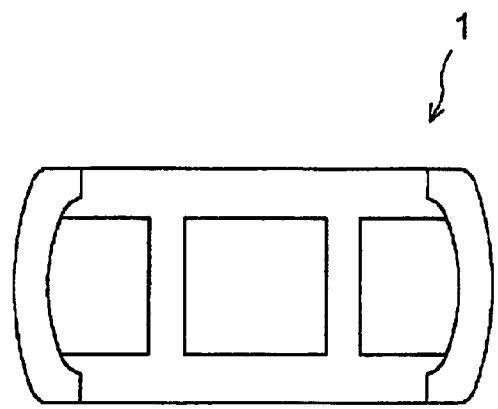
FIG. 1 is a front view partly in cutaway and partly in simplification, showing the shape of a constant velocity joint retainer 1 which is used in a torsional strength test.

In the process for producing a retainer for a constant velocity joint possessing improved machinability and flexural strength properties according to the present invention, a steel is first provided which comprises by weight carbon (C): 0.10 to 0.25%, silicon (Si): 0.03 to 0.15%, manganese (Mn): 0.20 to 0.60%, sulfur (S): 0.003 to 0.030%, chromium (Cr): 1.00 to 1.50%, titanium (Ti): 0.05 to 0.20%, boron (B): 0.0005 to 0.0050%, and nitrogen (N): not more than 0.01% with the balance consisting of iron (Fe) and inevitable impurities.

The reasons for the limitation of constituents in the steel used in the production process according to the present invention will be described. In the following description, "%" is by weight.

Carbon (C): Carbon is an element which significantly improves hardenability and is necessary for improving tensile and flexural strength. When the content of carbon is less than 0.10%, satisfactory strength cannot be provided. On the other hand, a carbon content exceeding 0.25% increases the hardness after hot forging, and this deteriorates machinability and, at the same time, deteriorates impact properties. For this reason, the carbon content is limited to 0.10 to 0.25%.

Silicon (Si): Silicon is an element which is necessary for deoxidation. When the content of silicon is less than 0.03%, the contemplated effect is unsatisfactory. On the other hand, a silicon content exceeding 0.15% increases hardness after hot forging and deteriorates machinability. For this reason, the silicon content is limited to 0.03 to 0.15%.

Manganese (Mn): Manganese is inexpensive and is an element necessary for ensuring the hardenability. When the content of manganese is less than 0.20%, the contemplated effect is unsatisfactory. On the other hand, a manganese content exceeding 0.60% increases hardness after hot forging and deteriorates machinability. For this reason, the manganese content is limited to 0.20 to 0.60%.

Sulfur (S): Sulfur is an element that forms MnS and TiS in the steel, which improves machinability. When the content of sulfur is less than 0.003%, the contemplated effect is small. On the other hand, when the sulfur content exceeds 0.030%, cracking occurs at the time of cold piercing. Therefore, the sulfur content is limited to 0.003 to 0.030%.

Chromium (Cr): Chromium is an element which is useful for improving hardenability and ensuring strength. When the content of chromium is less than 1.00%, strength high enough for use as a component cannot be provided. On the other hand, the addition of chromium in an amount exceeding 1.50% leads to an increase in hardness after hot forging and deteriorates machinability. For this reason, the chromium content is limited to 1.00 to 1.50%.

Titanium (Ti): Titanium is an element that fixes free nitrogen contained in the steel to promote the effect of improving the hardenability improvement effect of boron and, at the same time, combines with carbon contained in the steel to form a carbide which contributes to the fineness of grains. When the content of titanium is less than 0.05%, the effect of fining grains is small. On the other hand, a titanium content exceeding 0.20% results in the saturation of this effect and, in addition, increases hardness after hot forging. Therefore, the titanium content is limited to 0.05 to 0.20%.

Boron (B): Boron is an element which segregates at grain boundaries to improve grain boundary strength and significantly improves hardenability. When the content of boron is less than 0.0005%, the contemplated effect is unsatisfactory, while a boron content exceeding 0.0050% deteriorates the hardenability. For this reason, the boron content is limited to 0.0005 to 0.0050%.

Nitrogen (N): Nitrogen, when it is contained in an amount exceeding 0.01%, leads to an increased amount of TiN which deteriorates the machinability. Thus, the nitrogen content is limited to not more than 0.01%.

In the meantime, molybdenum (Mo) is an element which increases the hardness of the steel and deteriorates machinability. Therefore, preferably, molybdenum is not substantially contained in the steel except for the presence of molybdenum as an inevitable impurity.

In the production process according to the present invention, a steel having the above chemical composition is hot forged at a heating temperature of 1000 to 1100° C. to prepare a forged product having a Rockwell hardness of not more than 88 HRB. The Rockwell hardness can be measured according to JIS Z 2245 (1998). The hot forging is carried out under the above heating conditions for the following reasons. When the heat temperature in the hot forging is below 1000° C., the resistance to hot deformation is high and the service life of the mold is significantly deteriorated. On the other hand, a heating temperature above 1100° C. significantly increases hardness after hot forging as a result of increased amount of bainite formed and the precipitation of TiC. The steel can be softened by annealing or the like after hot forging. This, however, leads to a significant increase in cost. Bringing the heating temperature at the time of hot forging to 1000 to 1100° C. can provide low hardness without the need to perform heat treatment for softening such as annealing.

Since the step of machining is carried out after cooling following the hot forging, low hardness is preferred. When the hardness of the forged product exceeds 88 HRB, the machinability is significantly deteriorated. For this reason, the hardness is limited to not more than 88 HRB.

According to a preferred embodiment of the present invention, a method may be adopted wherein, after hot forging, the forged product is machined whereby the shape of a retainer can be roughly imparted to the forged product.

In the production process according to the present invention, the forged product is machined and is optionally pierced, whereby the shape of a retainer is imparted to the forged product.

The production process according to the present invention comprises the step of carburizing, quenching, and tempering the machined steel to attain an effective case depth of 0.4 to 0.9 mm. This effective case depth refers to the thickness (depth) of a layer having a Vickers hardness of not less than HV 550 formed on the surface of the steel and is defined as the distance from the surface of the steel to the position of the steel in its depth direction where the Vickers hardness is HV 550. The Vickers hardness HV can be measured according to JIS Z 2244 (1998). The effective case depth may be measured according to JIS G 0557 (1996). The effective case depth after the carburization/quenching/tempering is limited to the above-defined range for the following reason. After machining followed by carburization/quenching/ tempering, the effective case depth is less than 0.4 mm, upon flexural stress loading, a support is collapsed by the ball. This causes vibration or a deterioration in strength, making it impossible to provide properties necessary for the retainer. On the other hand, upon excessive flexural stress loading, at the corner R of the support, cracking first occurs in a carburized layer having high hardness and is then propagated, leading to final breaking. In the case of a large effective case depth exceeding 0.9 mm, the brittle crack length in an early stage is increased resulting in lowered strength. For this reason, the effective case depth is limited to 0.4 to 0.9 mm.

EXAMPLES

Embodiments of the present invention will be described with reference to the following examples and comparative examples.

The chemical compositions of steels in the examples and comparative examples are shown in Nos. 1 to 9 of Table 1. In the table, "steel of inv." refers to the steel according to the present invention. Steel Nos. 1 and 2 of the present invention respectively have the same chemical compositions as steels of SCr 415 and SCM 415 specified in JIS, except that the content of silicon and the content of manganese have been lowered, the content of chromium has been increased, and boron and titanium have been added. On the other hand, comparative steel Nos. 3 and 4 are respectively steels of SCr 415 and SCM 415. Comparative steel No. 5 has the same chemical composition as a steel of SCr 430 specified in JIS, except that the content of silicon and the content of manganese have been lowered, the content of chromium has been increased, and boron and titanium have been added. Comparative steel No. 6 has the same chemical composition as a steel of SCr 420, except that the content of manganese has been lowered, the content of chromium has been increased, and boron and titanium have been added. Comparative steel No. 7 has the same chemical composition as steel No. 1 of the present invention, except that the content of chromium has been significantly increased. Comparative steel No. 8 has the same chemical composition as a steel of SCr 420, except that the content of silicon and the content of manganese have been lowered and the content of chromium has been increased. Comparative steel No. 9 has the same chemical composition as a steel of SCr 420, except that the content of silicon and the content of manganese have been lowered, the content of chromium has been increased, and boron has been added.

100 kg of each of the steel products having chemical compositions (weight %; balance consisting essentially of iron) shown in Table 1 was produced by the melt process in a vacuum melting furnace. These steels were heated to 1250° C., were hot forged into φ40 and were then machined to prepare billets having a size of φ32×60 mm. The billets were heated at 1050° C. and were hot forged into a rough shape of a retainer. Thereafter, machining and piercing were carried out to prepare retainers having a shape shown in FIG. 1 which were then carburized, quenched, and tempered, then turned and polished to prepare final products. This carburization/quenching/tempering was carried out by holding the retainers at 880° C. for 3 hr followed by oil cooling to 130° C. and tempering at 180° C. for one hr.

Products thus obtained were tested as follows. The results are shown below.

Figure 2:
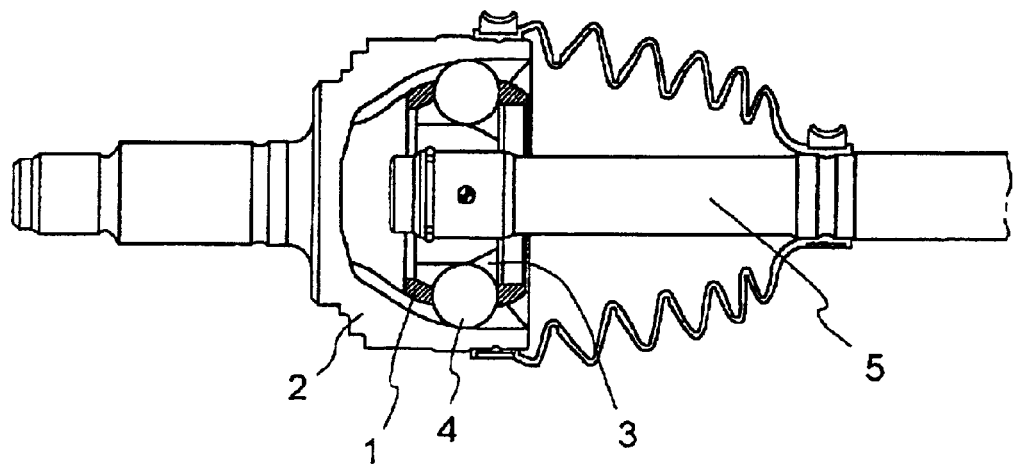
FIG. 2 is an assembly diagram of an outer race 2, an inner race 3, a ball 4, a retainer 1, and a drive shaft 5 in a constant velocity joint at the time of a torsional strength test.

In consideration of maximum load conditions applied to the retainer in automobiles, as shown in FIG. 2, a retainer 1 as a component to be evaluated and components of a constant velocity joint, i.e., an outer race 2, an inner race 3, balls 4, and a drive shaft 5, were assembled into a constant velocity joint. In the evaluation, with the outer race 2 fixed, a torsional torque was loaded in such a state that the drive shaft 5 was inclined at 40 degrees to the outer race 2 to apply high flexural stress to the support of the retainer 1. The effective case depth of the carburized layer was regarded as the position where the hardness was 550 HV as measured with a Vickers hardness meter. The hardness after hot forging was measured with a Rockwell hardness meter.

The hardness after hot forging at a heating temperature of 1050° C. is shown in Table 1. For both steel Nos. 1 and 2 of the present invention, the hardness was equivalent to or lower than those of the comparative steels which were steels specified in JIS and have the same level of carbon content as steel Nos. 1 and 2 of the present invention. On the other hand, comparative steel Nos. 5, 6, and 7, the hardness was high respectively due to significantly high carbon, silicon, and chromium contents.

C. for one hr. For both steel Nos. 1 and 2 of the present invention, as compared with comparative steel Nos. 3 and 4, grain boundary strengthening could be provided by virtue of the addition of boron, and grains were fined by the addition of titanium, contributing to excellent strength. For comparative steel Nos. 5, 6, and 7, the machinability was poor although grains were fined. For comparative steel No. 8, the strength could not be increased although the hardness was lowered. For comparative steel No. 9, grains were not fined and, thus, a significant improvement in strength could not be provided. On the other hand, in Table 2, for steel Nos. 1 and 2 of the present invention and comparative steel Nos. 3 and 4, to which * was attached, wherein carburization was carried out at 920° C. for 4 hr, due to increased effective case depth, the initial crack length upon flexural stress loading was increased resulting in deteriorated strength.

TABLE 1

| No. | C | Si | Mn | P | S | Cr | Mo | B | Ti | Al | N | (weight %) Hardness after forging (HRB) |
|---|---|---|---|---|---|---|---|---|---|---|---|---|
| Steel of inv. | | | | | | | | | | | | |
| 1 | 0.20 | 0.07 | 0.37 | 0.012 | 0.015 | 1.35 | — | 0.0013 | 0.131 | 0.018 | 0.0065 | 83 |
| 2 | 0.15 | 0.12 | 0.45 | 0.010 | 0.017 | 1.40 | — | 0.0015 | 0.144 | 0.019 | 0.0054 | 81 |
| Comp. steel | | | | | | | | | | | | |
| 3 | 0.16 | 0.25 | 0.82 | 0.012 | 0.013 | 1.18 | — | — | — | 0.028 | 0.0155 | 82 |
| 4 | 0.15 | 0.23 | 0.80 | 0.011 | 0.015 | 1.05 | 0.15 | — | — | 0.030 | 0.0161 | 84 |
| 5 | 0.29 | 0.08 | 0.45 | 0.012 | 0.014 | 1.40 | — | 0.0017 | 0.147 | 0.021 | 0.0067 | 89 |
| 6 | 0.22 | 0.30 | 0.48 | 0.013 | 0.016 | 1.42 | — | 0.0010 | 0.162 | 0.019 | 0.0079 | 89 |
| 7 | 0.21 | 0.13 | 0.49 | 0.011 | 0.012 | 1.85 | — | 0.0012 | 0.155 | 0.019 | 0.0066 | 90 |
| 8 | 0.21 | 0.11 | 0.41 | 0.011 | 0.016 | 1.30 | — | — | — | 0.028 | 0.0151 | 80 |
| 9 | 0.20 | 0.09 | 0.37 | 0.013 | 0.011 | 1.42 | — | 0.0010 | 0.020 | 0.022 | 0.0052 | 84 |

Figure 3:
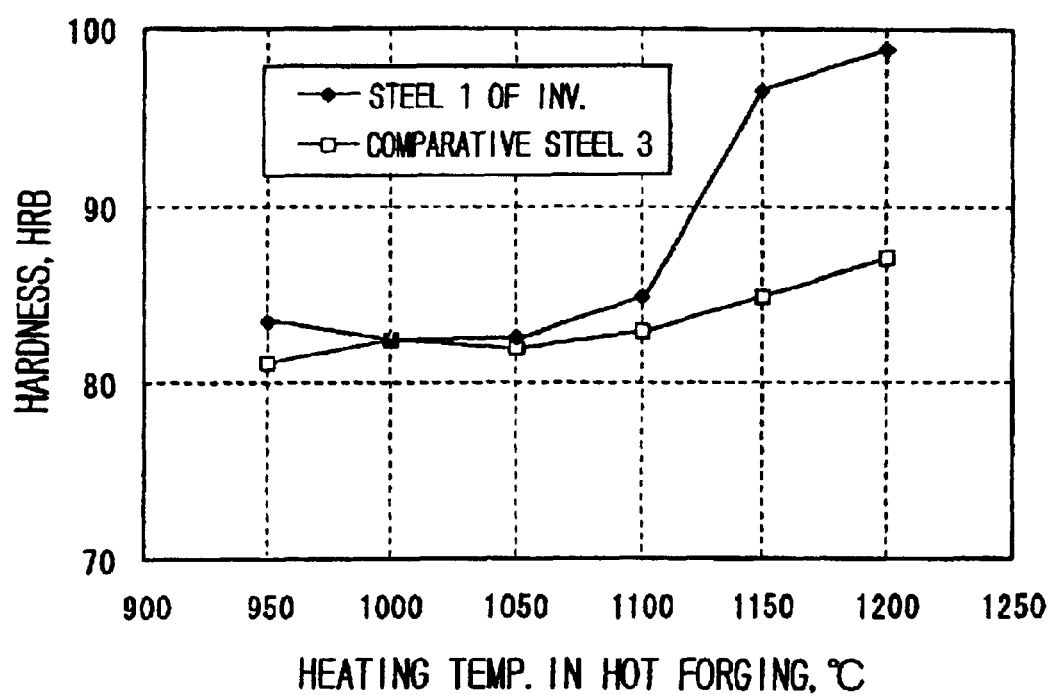
FIG. 3 is a diagram showing the influence of conditions for heating at the time of hot forging on hardness after hot forging.

The hardness after hot forging at a heating temperature of 950 to 1200° C. in steel No. 1 of the present invention and comparative steel No. 3 is shown in FIG. 3. As is apparent from FIG. 3, in the case of steel No. 1 of the present invention, the hardness was significantly lowered upon forging at a heating temperature of 1100° C. or below. On the other hand, for comparative steel No. 3, the hardness decreases with decreasing the heating temperature. In this case, however, the heat temperature dependency is not significant as compared with steel No. 1 of the present invention. This is because, in the case of steel No. 1 of the present invention, upon heating at 1150° C. or above, TiC, which is in solid solution in the steel, is precipitated in the course of cooling to cause hardening. At 950° C., the softening effect is saturated, and the service life of the mold is lowered due to increased deformation resistance. For this reason, for lowering the hardness, the heating temperature at the time of hot forging is optimally 1000 to 1100° C.

The results of measurement of the effective case depth after carburization/quenching, together with the results of the static torsion test, are shown in Table 2. In order to examine the influence of the carburized case depth, steel No. 1 of the present invention and comparative steel No. 3 were subjected to carburization/quenching/tempering in such a manner that these steels were held at 920° C. for 4 hr, were then cooled in an oil to 130° C., and were tempered at 180°

TABLE 2

| No. | Carburization conditions | Effective case depth, mm | Grain size No. | Breaking torque, kgf. m |
|---|---|---|---|---|
| Steel of inv. | | | | |
| 1 | 880° C. × 3 hr | 0.78 | 10.2 | 368 |
| 2 | | 0.75 | 10.4 | 366 |
| Comp. steel | | | | |
| 3 | 880° C. × 3 hr | 0.80 | 8.1 | 320 |
| 4 | | 0.84 | 8.3 | 325 |
| 5 | | 0.95 | 10.5 | 322 |
| 6 | | 0.81 | 10.2 | 343 |
| 7 | | 0.93 | 10.3 | 345 |
| 8 | | 0.60 | 8.3 | 301 |
| 9 | | 0.78 | 6.7 | 330 |
| Steel of inv. | | | | |
| 1* | 920° C. × 4 hr | 0.98 | 10.3 | 334 |
| 2* | | 0.91 | 10.3 | 339 |
| Comp. steel | | | | |
| 3* | 920° C. × 4 hr | 1.10 | 8.2 | 300 |
| 4* | | 1.17 | 8.0 | 288 |

As is apparent from the foregoing description, the process for producing a retainer for a constant velocity joint according to the present invention has the following effects.

1) The addition of 0.05 to 0.20% of titanium and 0.0005 to 0.0050% of boron in the chemical composition of the steel fines grains and strengthenes grain boundaries, and this can realize the production of a retainer for a constant velocity joint possessing excellent flexural strength properties.
2) Further, the limitation of the amount of silicon and manganese added and the limitation of hot forging conditions can realize the production of a retainer for a constant velocity joint without sacrificing the machinability.
3) The limitation of the effective case depth at the time of carburization/quenching can realize the production of a constant velocity joint component possessing excellent flexural properties.

Thus, according to the present invention, a retainer for a constant velocity joint possessing excellent flexural strength properties can be produced without sacrificing the machinability, and a reduction in weight of automobiles can be realized.

What is claimed is:

1. A process for producing a retainer for a constant velocity joint having improved machinability and flexural strength properties, said process comprising the steps of:
    providing a steel comprising by weight carbon (C): 0.10 to 0.25%, silicon (Si): 0.03 to 0.15%, manganese (Mn): 0.20 to 0.60%, sulfur (S): 0.003 to 0.030%, chromium (Cr): 1.00 to 1.50%, titanium (Ti): 0.05 to 0.20%, boron (B): 0.0005 to 0.0050%, and nitrogen (N): not more than 0.01% with the balance consisting of iron (Fe) and inevitable impurities;
    hot forging the steel at a heating temperature of 1000 to 1100° C. to prepare a forged product having a Rockwell hardness of not more than 88 HRB;
    machining and optionally piercing the forged product;
    carburizing and quenching and tempering the machined steel to attain an effective case depth of 0.4 to 0.9 mm, said effective case depth being defined as the distance from the surface of the steel to the position of the steel in its depth direction where the Vickers hardness is HV 550.

* * * * *

UNITED STATES PATENT AND TRADEMARK OFFICE
CERTIFICATE OF CORRECTION

| | | |
|---|---|---|
| PATENT NO. | : 6,800,144 B2 | Page 1 of 1 |
| APPLICATION NO. | : 10/171415 | |
| DATED | : October 5, 2004 | |
| INVENTOR(S) | : Nishimori et al. | |

It is certified that error appears in the above-identified patent and that said Letters Patent is hereby corrected as shown below:

On title page, under Item (73) Assignees, insert

-- [*] Notice: The term of this patent shall not extend beyond the expiration date of Patent No. 6,641,680. --

NOTE: This "Notice" will void the existing "Notice" granting a Patent Term Extension of 174 days.

Signed and Sealed this

Twenty-second Day of May, 2007

JON W. DUDAS
*Director of the United States Patent and Trademark Office*